(12) United States Patent
Jeon et al.

(10) Patent No.: US 9,305,705 B2
(45) Date of Patent: *Apr. 5, 2016

(54) MULTILAYER CERAMIC ELECTRONIC COMPONENT

(71) Applicant: SAMSUNG ELECTRO-MECHANICS CO., LTD., Suwon, Gyunggi-do (KR)

(72) Inventors: Byung Jun Jeon, Gyunggi-do (KR); Kyu Ha Lee, Gyunggi-do (KR); Hyun Hee Gu, Gyunggi-do (KR); Chang Hoon Kim, Gyunggi-do (KR); Myung Jun Park, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 235 days.

This patent is subject to a terminal disclaimer.

(21) Appl. No.: 13/902,628

(22) Filed: May 24, 2013

(65) Prior Publication Data

US 2014/0233149 A1    Aug. 21, 2014

(30) Foreign Application Priority Data

Feb. 20, 2013  (KR) .......................... 10-2013-0018275

(51) Int. Cl.
| | |
|---|---|
| *H01G 4/00* | (2006.01) |
| *H01G 4/228* | (2006.01) |
| *H01G 4/005* | (2006.01) |
| *H01G 4/12* | (2006.01) |
| *H01G 4/30* | (2006.01) |
| *H01G 4/012* | (2006.01) |
| *H01G 4/232* | (2006.01) |

(52) U.S. Cl.
CPC ............... *H01G 4/005* (2013.01); *H01G 4/012* (2013.01); *H01G 4/12* (2013.01); *H01G 4/232* (2013.01); *H01G 4/30* (2013.01); *H01G 4/1227* (2013.01)

(58) Field of Classification Search
USPC ............ 361/303, 311, 301.4, 306.1; 29/25.42
See application file for complete search history.

(56) References Cited

U.S. PATENT DOCUMENTS

| 2005/0286208 A1* | 12/2005 | Ito et al. ...................... 361/321.5 |
| 2008/0130198 A1* | 6/2008 | Nakano et al. ................. 361/303 |
| 2011/0069424 A1* | 3/2011 | Shiota et al. ................ 361/321.4 |
| 2014/0233148 A1* | 8/2014 | Jeon et al. .................. 361/301.4 |

FOREIGN PATENT DOCUMENTS

| JP | 10-135063 | 5/1998 |
| JP | 2005-268290 A | 9/2005 |

* cited by examiner

*Primary Examiner* — Eric Thomas
(74) *Attorney, Agent, or Firm* — McDermott Will & Emery LLP

(57) ABSTRACT

There is provided a multilayer ceramic electronic component including a ceramic body having internal electrodes formed therein, external electrodes formed on external surfaces of the ceramic body and connected to the internal electrodes, and a buffer layer formed on surfaces of contact between the internal electrodes and the external electrodes among external surfaces of the ceramic body, in an interior direction of the ceramic body, wherein when a thickness of the external electrode is denoted by T, a thickness of the buffer layer is denoted by t, a thickness of an active region is denoted by $T_A$, and a thickness of the ceramic body is denoted by $T_C$, $T \leq 10$ μm, $T_A/T_C > 0.8$, and $t \leq 5$ μm, so that a multilayer ceramic electronic component having excellent reliability may be realized.

32 Claims, 1 Drawing Sheet

X-X'

MULTILAYER CERAMIC ELECTRONIC COMPONENT

CROSS-REFERENCE TO RELATED APPLICATIONS

This application claims the priority of Korean Patent Application No. 10-2013-0018275 filed on Feb. 20, 2013, in the Korean Intellectual Property Office, the disclosure of which is incorporated herein by reference.

BACKGROUND OF THE INVENTION

1. Field of the Invention

The present invention relates to a multilayer ceramic electronic component, and more particularly, to a multilayer ceramic electronic component having excellent reliability.

2. Description of the Related Art

As electronic products have tended to be miniaturized and high-functionalized, electronic components have correspondingly been required to have smaller sizes and higher degrees of capacitance. Due to the requirement for miniaturization and high amounts of capacitance in electronic components, multilayer ceramic electronic components are drawing attention as electronic components able to be miniaturized and provided with high levels of capacitance, and thus, demand for multilayer ceramic electronic components is increasing.

In order to realize miniaturization and high levels of capacitance in multilayer ceramic capacitors, internal electrodes thereof are required to be both thinned and laminated in large numbers.

In general, external electrodes provided on multilayer ceramic electronic components may contain a glass component, and the glass component may be diffused and penetrate into a ceramic body during a sintering procedure. Due to this, the content of glass present in the external electrodes is decreased, resulting in decreased compactness of the external electrodes.

In the case in which the compactness of the external electrodes is decreased, the plating liquid or the like may penetrate through the external electrodes, causing a deterioration in product reliability.

In Related Art Documents, Patent Document 1 discloses that a diffusion layer is provided on the entire surface of the ceramic body. Patent Document 2 discloses that conductive portions having the same conductivity characteristics as those of external electrodes are included on portions of the outermost ceramic layers corresponding to positions of the external electrode to thereby improve adhesion properties therebetween.

RELATED ART DOCUMENTS (Patent Document 1) Japanese Patent Laid-Open Publication No. 1998-135063
(Patent Document 2) Japanese Patent Laid-Open Publication No. 2005-268290

SUMMARY OF THE INVENTION

An aspect of the present invention provides a multilayer ceramic electronic component having excellent resistance to penetration of a plating liquid or the like, by preventing deteriorations in the compactness of external electrodes.

According to an aspect of the present invention, there is provided a multilayer ceramic electronic component, including: a ceramic body having internal electrodes formed therein; external electrodes formed on external surfaces of the ceramic body and connected to the internal electrodes; and a buffer layer formed on surfaces of contact between the internal electrodes and the external electrodes among external surfaces of the ceramic body, in an interior direction of the ceramic body, wherein when a thickness of the external electrodes is denoted by T, a thickness of the buffer layer is denoted by t, a thickness of an active region is denoted by $T_A$, and a thickness of the ceramic body is denoted by $T_c$, $T \leq 10$ μm, $T_A/T_c > 0.8$, and $t \leq 5$ μm.

The buffer layer may include a boron content of 50% or more.

The ceramic body may include a rectangular parallelepiped form.

The internal electrodes may include a rectangular shape.

The external electrodes may be formed on end surfaces of the ceramic body.

The external electrodes may be extended to portions of upper, lower and side surfaces of the ceramic body.

The ceramic body may include barium titanate or strontium titanate.

The external electrodes may include glass.

The internal electrodes may include at least one selected from the group consisting of gold (Au), silver (Ag), copper (Cu), nickel (Ni), palladium (Pd), platinum (Pt), and alloys thereof.

The external electrodes may include at least one selected from the group consisting of gold (Au), silver (Ag), palladium (Pd), copper (Cu), nickel (Ni), and alloys thereof.

According to an aspect of the present invention, there is provided a multilayer ceramic electronic component, including: external electrodes including first and second external electrodes formed on end surfaces of a ceramic body, which oppose each other; internal electrodes including first and second internal electrodes laminated and separated from each other in the interior of the ceramic body, the first and second internal electrodes being connected to the first and second external electrodes, respectively; and buffer layers formed from the end surfaces of the ceramic body in an interior direction of the ceramic body, respectively, wherein when a thickness of the external electrodes is denoted by T, a thickness of the buffer layer is denoted by t, a thickness of an active region is denoted by $T_A$, and a thickness of the ceramic body is denoted by $T_c$, $T \leq 10$ μm, $T_A/T_c > 0.8$, and $t \leq 5$ μm.

The buffer layer may be provided as a region from the end surface of the ceramic body to a portion in which a boron component is detected.

The ceramic body may include a rectangular parallelepiped form.

The internal electrodes may include a rectangular shape.

The external electrodes may be extended to portions of upper, lower and side surfaces of the ceramic body.

The ceramic body may include barium titanate or strontium titanate.

The external electrodes may include glass.

The internal electrodes may include at least one selected from the group consisting of gold, silver, copper, nickel, palladium, platinum, and alloys thereof.

The external electrodes may include at least one selected from the group consisting of gold, silver, palladium, copper, nickel, and alloys thereof.

According to an aspect of the present invention, there is provided a method of manufacturing a multilayer ceramic electronic component, the method including: preparing a paste for external electrodes including glass; forming external electrodes on a sintered chip, in which internal electrodes are laminated, by using the paste for external electrodes; and sintering the external electrodes by regulating a temperature increase rate at a softening point of the glass or higher to control a thickness of a buffer layer.

The temperature increase rate may be increased to decrease the thickness of the buffer layer.

The temperature increase rate may be decreased to increase the thickness of the buffer layer.

According to an aspect of the present invention, there is provided a method of manufacturing a multilayer ceramic electronic component, the method including: preparing a paste for external electrodes including glass; forming external electrodes on a sintered chip, in which internal electrodes are laminated, by using the paste for external electrodes; and sintering the external electrodes, wherein in the preparing of the paste for external electrodes, a thickness of a buffer layer is controlled by regulating contents of an alkali metal and vanadium contained in the glass.

The alkali metal may be at least one selected from the group consisting of lithium (Li), sodium (Na), potassium (K), rubidium (Rb), and cesium (Cs).

The thickness of the buffer layer may be increased by increasing contents of the alkali metal and vanadium oxide.

The thickness of the buffer layer may be decreased by decreasing contents of the alkali metal and vanadium oxide included therein.

Here, in the sintering, the thickness of the buffer layer may be controlled by regulating a temperature increase rate at a softening point of the glass or higher.

The temperature increase rate may be increased to decrease the thickness of the buffer layer.

The temperature increase rate may be decreased to increase the thickness of the buffer layer.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

Figure 1:
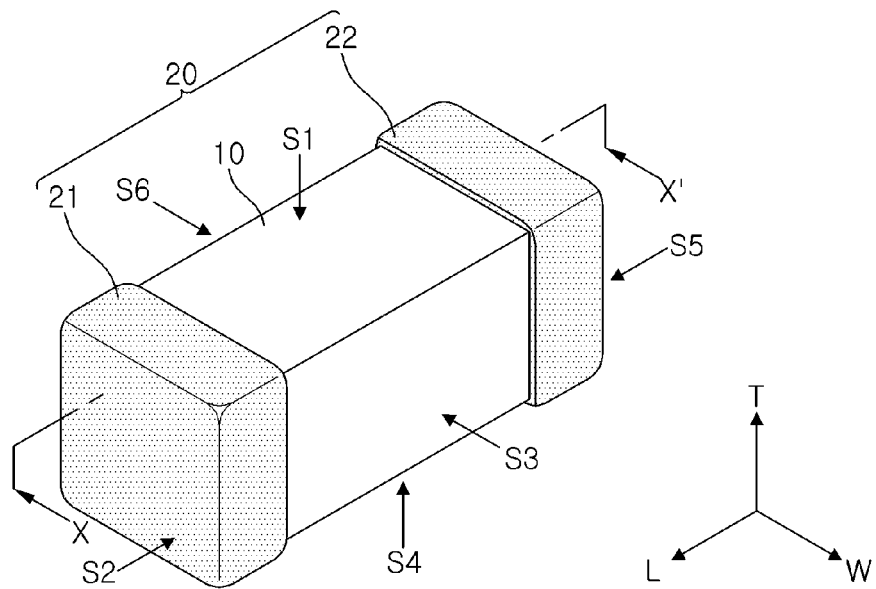
FIG. 1 is a perspective view of a multilayer ceramic electronic component according to an embodiment of the present invention.
Figure 2:
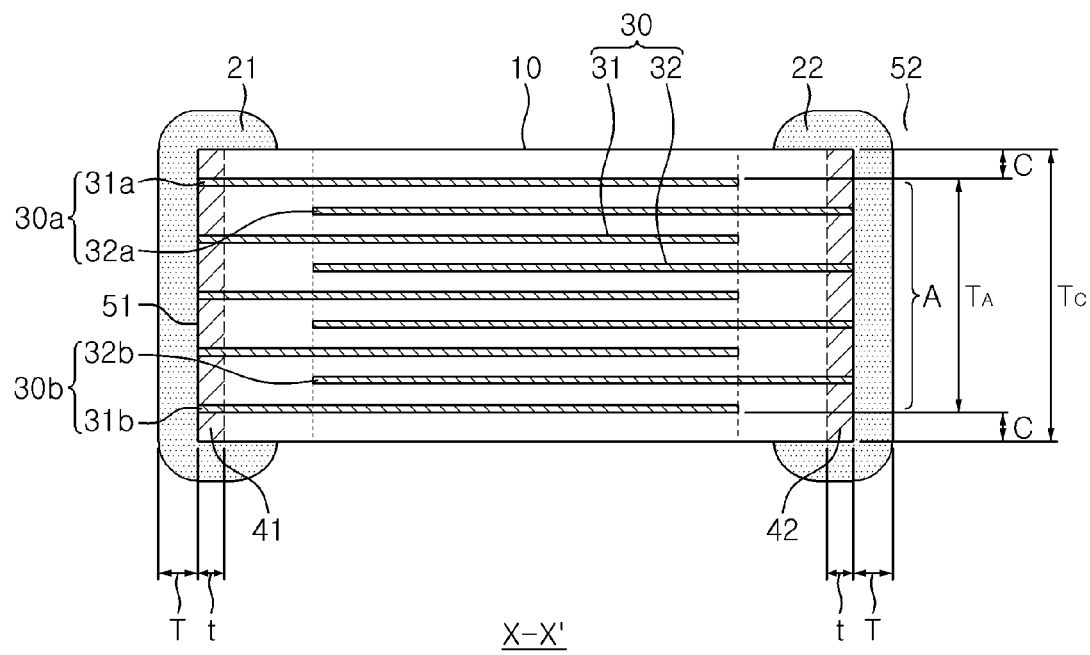
FIG. 2 is a cross-sectional view taken along line X-X' of FIG. 1.

FIG. 1 is a perspective view of a multilayer ceramic electronic component according to an embodiment of the present invention. FIG. 2 is a cross-sectional view taken along line X-X' of FIG. 1.

Referring to FIGS. 1 and 2, a multilayer ceramic electronic component according to an embodiment of the present invention may include a ceramic body 10, internal electrodes 30 laminated in the interior of the ceramic body 10, external electrodes 20 formed on external surfaces of the ceramic body 10, and buffer layers 41 and 42 formed in the interior of the ceramic body.

The ceramic body 10 may be in a rectangular parallelepiped form. An "L direction", a "W direction", and a "T direction" may denote a "length direction", a "width direction", and a "thickness direction", respectively. Here, the thickness direction may refer to a direction in which the internal electrodes 30 are laminated. As for the ceramic body 10, the width may be equal to the thickness thereof. The ceramic body 10 may include an upper surface S1, a lower surface S4, side surfaces S3 and S6, and end surfaces S2 and S5.

The ceramic body 10 may include a dielectric material having a high dielectric constant, specifically, barium titanate or strontium titanate. However, the present invention is not limited thereto.

Since the dielectric material includes electric dipoles, it may be able to accumulate a greater amount of charge.

The external electrodes 20 may be formed on external surfaces of the ceramic body 10, and specifically, may be formed on the end surfaces S2 and S5 in the length direction ("L direction") thereof. The external electrodes 20 may be extended to portions of the upper and lower surfaces S1 and S4 and the side surfaces S3 and S6 of the ceramic body 10.

The external electrodes 20 may include first and second external electrodes 21 and 22, and electrical charges having opposite polarities may be applied to the first and second external electrodes 21 and 22.

The external electrodes 20 may include conductive metal and glass. The conductive metal may include at least one selected from the group consisting of gold, silver, palladium, copper, nickel, and alloys thereof.

The glass may be added to fill pores formed in the external electrodes 20, and thus the compactness of the external electrodes 20 may be improved. When pores are present in the external electrodes 20, a plating liquid or the like may infiltrate through the pores, resulting in deteriorated reliability of the electronic component.

The internal electrodes 30 may be laminated in the interior of the ceramic body 10, and may have, without limitation thereon, a rectangular shape. The internal electrodes 30 may include first and second internal electrodes 31 and 32. The first and second internal electrodes 31 and 32 may be drawn out in opposing directions and respectively connected to the first and second external electrodes 21 and 22, so that the first and second internal electrodes 31 and 32 may be charged with electrical charges having opposite polarities.

The internal electrodes 30 may include at least one selected from the group consisting of gold, silver, copper, nickel, palladium, platinum, and alloys thereof. However, the present invention is not limited thereto, and any material that can impart conductivity to the internal electrodes 30 may be used without particular limitation.

The buffer layers 41 and 42 may be formed in an interior direction of the ceramic body 10 from surfaces of contact 51 and 52 between the first and second internal electrodes 31 and 32 and the first and second external electrodes 21 and 22, respectively. The surfaces of contact are surfaces on which the internal electrodes 30 contact the external electrodes 20, in external surfaces of the ceramic body 10. Specifically, referring to FIG. 2, the end surfaces S2 and S5 of the ceramic body may be the surfaces of contact 51 and 52.

The glass component contained in the external electrodes 20 may penetrate into the ceramic body 10 through the grain boundary of the ceramic body 10. The glass component penetrating into the ceramic body 10 may dissolve oxides constituting the ceramic body 10, and thus glassy phase buffer layers 41 and 42 may be formed.

The buffer layers 41 and 42 may be higher than the ceramic body 10 in light of contents of elements constituting the glass. The elements constituting the glass may be mainly silicon (Si), boron (B), and the like, which can form a glass network structure.

From the different viewpoint, the buffer layers 41 and 42 may be lower than the ceramic body 10 in light of a content of barium (Ba). The ceramic body 10 may be mainly composed of barium titanate. In the case that the glass penetrates from the external electrodes 20, the content of barium (Ba) may be relatively low.

The buffer layers 41 and 42 may be defined by a region in which the content of boron (B), absent in a ceramic base material, is detected in a component constituting the glass.

The thickness (t) of the buffer layer 41 or 42 may be a size of the buffer layer 41 or 42 in the length direction ('L' direction), which is measured from the end surface S2 or S5 of the ceramic body 10.

The thickness (t) of the buffer layer 41 or 42 may be measured by performing scanning in the length direction from the end surface S2 or S5 of the ceramic body 10, using EPMA, EDX, or the like. That is, the thickness (t) of the buffer layer 41 or 42 may be determined by a distance in a region from the end surface of the ceramic body 10 to a portion in which boron (B) is detected.

The thickness (t) of the buffer layer 41 or 42 may be provided by an average value. The thickness (t) of the buffer layer 41 or 42 may be determined by measuring values of 10 regions that are equidistant on the image obtained by scanning a cross section defined by a length direction and a thickness direction (L-T cross section) of the ceramic body 10 using a scanning electron microscope, and then averaging the measured values.

10 regions may be regions which, respectively, correspond to five layers of internal electrodes from the center of the ceramic body toward both sides in a thickness direction.

In the present embodiment, the thickness (T) of the external electrodes may be smaller than or equal to 10 μm. That is, T≤10 μm.

As the thickness of the external electrodes is reduced, the reliability may be deteriorated due to the deterioration in compactness of the external electrodes. The present invention is to solve the problem of deterioration in reliability, which may occur when the thickness (T) of the external electrodes is smaller than or equal to 10 μm.

With respect to the fact that the reliability is deteriorated as the thickness of the external electrodes is reduced, the content of glass that moves from the external electrodes toward the ceramic body in the sintering procedure of the external electrodes may be constant when the thickness of the buffer layer has the same thickness. Therefore, as the thickness of the external electrodes is reduced, the content of glass remaining in the external electrodes may be smaller.

Glass may serve to fill pores of the external electrodes. So, as the content of glass becomes smaller, the external electrodes may include more pores. Therefore, the plating liquid may easily penetrate through the pores in the plating procedure, and thus the reliability may be further deteriorated.

The thickness (T) of the external electrodes 20 may refer to a size in a length direction ("L" direction) from the end surface S2 or S5 of the ceramic body 10, as for the external electrodes 20 formed on the end surface S2 or S5 of the ceramic body 10.

The thickness (T) of the external electrodes 20 may be indicated by an average value.

The thickness (T) of the external electrodes 20 may be determined by measuring thicknesses of any 10 regions in a central portion in the thickness direction of the ceramic body 10 on the image obtained by scanning a cross section defined by the length direction (L direction) and the thickness direction (T direction) (L-T cross section) at a central portion in a width direction of the ceramic body 10, using a scanning electron microscope, and then averaging the measured thicknesses.

The central portion in a width direction may be a region ranging from the center of the ceramic body 10 toward both sides in a width direction of the ceramic body, within 30% of the width of the ceramic body 10. Within the above range, the thickness (T) of the external electrodes 20 may show a stable value.

The central portion in a thickness direction may be a region ranging from the center of the ceramic body 10 toward both sides in a thickness direction of the ceramic body, within the fifth internal electrodes 30.

In addition, the ratio of thickness of an active region ($T_A$) to thickness of the ceramic body ($T_C$), $T_A/T_C$, may be greater than 0.8. That is, $T_A/T_C > 0.8$.

The active region A may refer to a region between the uppermost internal electrode 31a and the lowermost internal electrode 31b in a thickness direction (T direction) of the ceramic body. A cover region C may refer to a region between the upper surface S1 of the ceramic body 10 and the uppermost internal electrode 31a and a region between the lower surface S4 of the ceramic body and the lowermost internal electrode 31b.

The glass of the external electrodes may diffuse into the ceramic body while involving a phenomenon in which metal elements of the external electrodes diffuse into the internal electrodes. As the amount of metal elements of the external electrodes diffusing into the internal electrodes increases, the glass of the external electrodes may be further diffused. As more internal electrodes are present in the ceramic body, the movement of the glass of the external electrodes may be further increased.

The fact that the ratio of thickness of the active region to thickness of the ceramic body is large may mean that the percentage of the internal electrodes in the ceramic body is large. Therefore, as the ratio of thickness of the active region as compared with thickness of the ceramic body is larger, the movement of the glass of the external electrodes may be further increased.

As the glass gets out of the external electrodes, the content of glass present in the external electrodes is further decreased, and thus the plating liquid or the like may penetrate through the pores of the external electrodes, resulting in deteriorating the reliability.

In the present embodiment, the thickness (t) of the buffer layer 41 or 42 may be smaller than or equal to 5 μm. That is, t≤5 μm.

When the thickness (t) of the buffer layer 41 or 42 is 5 μm or greater, the reliability may be deteriorated. The case in which the thickness (t) of the buffer layer 41 or 42 is 5 μm or greater may refer to a case in which a large amount of glass that is contained in the external electrodes 20 penetrates or diffuses into the ceramic body 10 to form a relatively thick buffer layer 41 or 42.

The glass contained in the external electrodes 20 penetrates or diffuses into the ceramic body 10, and thus the content of glass may be decreased in the external electrodes 20, and more pores may be present in the external electrodes 20 to decrease the compactness thereof.

In the case in which the compactness of the external electrodes 20 is decreased, the plating liquid may penetrate through the external electrodes 20, resulting in deteriorating reliability. This phenomenon may be more severe when the thickness (T) of the external electrodes 20 is reduced.

The buffer layers 41 and 42 may function to relax the stress occurring due to the inter-diffusion of metal elements between the internal electrodes 30 and the external electrodes 20, and this will be explained as follows.

First, a mechanism in which the stress occurs in the ceramic body due to the inter-diffusion of metal elements between the internal electrodes and the external electrodes will be described.

The diffusion rate of the conductive metal contained in the external electrodes 20 may be greater than the diffusion rate of the conductive metal contained in the internal electrodes 30. Specifically, in the case in which copper is contained in the external electrodes 20 and nickel is contained in the internal electrodes 30, the diffusion rate of copper may be greater than the diffusion rate of nickel.

In the sintering procedure, copper of the external electrodes 20 diffuses into the internal electrodes 30 and nickel of the internal electrodes 30 diffuses into the external electrodes 20, to form a copper-nickel alloy. Since the diffusion rate of copper is faster than the diffusion rate of nickel, the volume of the internal electrodes 30 may further expand.

Due to this difference in volume, the stress may be induced in the ceramic body 10. In the case in which the stress exceeds the critical value, defects such as radial cracks may occur in the ceramic body 10.

As the internal electrodes 30 becomes thinner and more internal electrodes 30 are laminated, the difference in volume caused by the inter-diffusion of metal elements between the internal electrodes 30 and the external electrodes 20 may be bigger. The stress induced in the ceramic body 10 may be further increased, and more radial cracks may occur.

Then, a mechanism in which the stress occurring due to the inter-diffusion of metal elements between the internal electrodes 30 and the external electrodes 20 is relaxed will be described.

The difference in volume due to the inter-diffusion of metal elements between the internal electrodes 30 and the external electrodes 20 may induce the stress in the ceramic body 10. At the same time, the glass component of the external electrodes 20 also penetrates into the grain boundary of the ceramic body 10 to thereby dissolve oxides constituting the ceramic body 10.

Even in a case in which the stress occurs in the ceramic body 10 due to the inter-diffusion of metal elements between the internal electrodes 30 and the external electrodes 20, at the same time, a portion of the ceramic body 10 is dissolved to be a liquid phase, and thus, the stress may be relaxed at the portion of the ceramic body 10 that is in the liquid phase.

Hereinafter, the control of the thickness (t) of the buffer layer 41 or 42 will be described in light of the process condition and glass composition.

First, in light of the process condition, the thickness (t) of the buffer layer 41 or 42 may be controlled by regulating the retention time at a softening point of glass or higher in the sintering procedure of the external electrodes 20. Specifically, the thickness (t) of the buffer layer 41 or 42 may be controlled by regulating the temperature increase rate at the softening point or higher.

At the softening point of glass or lower, glass has no fluidity and thus cannot penetrate or diffuse into the ceramic body 10. At the softening point or higher, glass has fluidity and thus can penetrate or diffuse into the ceramic body 10.

When the temperature increase rate is decreased to thereby increase the retention time at the softening point of glass or lower, or the temperature is rapidly raised to thereby decrease the retention time at the softening point of glass or higher, the thickness (t) of the buffer layer 41 or 42 may be decreased. On the contrary, when the temperature increase rate is gentle at the softening point of glass or higher to thereby increase the retention time, the thickness (t) of the buffer layer 41 or 42 may be increased.

Second, in light of the glass composition, the thickness (t) of the buffer layer 41 or 42 may be controlled by regulating contents of an alkali metal and vanadium oxide.

The use of glass having a large content of an alkali metal and vanadium oxide may further increase the thickness (t) of the buffer layer 41 or 42. The reason is that the softening point of glass may be lowered as contents of an alkali metal and vanadium oxide are increased, resulting in increasing fluidity of the glass, which may induce more active penetration or diffusion of glass.

On the contrary, when glass having small contents of an alkali metal and vanadium oxide is used, since fluidity of glass is relatively low, penetration or diffusion of glass may be difficult, and thus, the thickness (t) of the buffer layer 41 or 42 may be decreased.

According to another embodiment of the present invention, a method of manufacturing a multilayer ceramic electronic component may include preparing a paste for external electrodes 20, including glass; forming external electrodes on a sintered chip, in which internal electrodes 30 are laminated, by using the paste for external electrodes 20; and sintering the external electrodes 20 by regulating a temperature increase rate at a softening point of the glass or higher to control a thickness of the buffer layer 41 or 42.

First, a paste for external electrodes 20 may be prepared by mixing a conductive metal powder for imparting conductivity to the external electrodes 20, a glass powder for attaining compactness of the external electrodes 20, ethanol as an organic solvent, polyvinyl butyral as a binder, and the like, followed by ball milling.

Then, the external electrodes 20 may be formed on a sintered chip by a dipping method or a printing method, using the paste for external electrodes 20.

The sintered chip may be manufactured as follows. That is, ceramic green sheets may be prepared by using a ceramic slurry including a high-dielectric ceramic powder such as barium titanate. Internal electrodes 30 are, respectively, printed on the ceramic green sheets by using a paste for an internal electrodes 30 including a conductive metal such as nickel or the like. The ceramic green sheets on which the internal electrodes 30 are printed are laminated to prepare a green sheet laminate. The green sheet laminate is cut into green chips, which are then sintered to produce respective sintered chips in which the internal electrodes 30 are laminated.

Then, in a sintering procedure of the external electrode 20, the temperature increase rate is regulated at a softening point of glass or higher, to thereby control the thickness (t) of the buffer layer 41 or 42.

At the softening point of glass or lower, glass has no fluidity and thus cannot penetrate or diffuse into the ceramic body 10. At the softening point or higher, glass has fluidity and thus may penetrate or diffuse into the ceramic body 10.

When the temperature increase rate is decreased to thereby increase the retention time at the softening point of glass or lower, or the temperature is rapidly raised to thereby decrease the retention time at the softening point of glass or higher, the thickness (t) of the buffer layer 41 or 42 may be decreased. On the contrary, when the temperature increase rate is gentle at the softening point of glass or higher to thereby increase the retention time, the thickness (t) of the buffer layer 41 or 42 may be increased.

Other descriptions of the ceramic powder, external electrodes 20, internal electrodes 30, and buffer layers 41 and 42 are the same as those in the above-mentioned embodiment.

According to another embodiment of the present invention, a method of manufacturing a multilayer ceramic electronic component may include preparing a paste for external electrodes 20, including glass; forming external electrodes 20 on a sintered chip, in which internal electrodes 30 are laminated, by using the paste for external electrodes 20; and sintering the external electrodes 20, wherein in the preparing of the paste for external electrodes 20, a thickness of a buffer layer 41 or 42 is controlled by regulating contents of an alkali metal and vanadium oxide contained in the glass.

First, a paste for external electrodes 20 may be prepared by mixing a conductive metal powder for imparting conductivity to the external electrodes 20, a glass powder for attaining compactness of the external electrodes 20, ethanol as an organic solvent, polyvinyl butyral as a binder, and the like, followed by ball milling.

Then, the external electrodes 20 may be formed on a sintered chip by a dipping method or a printing method, using the paste for external electrodes 20. Descriptions thereof are the same as those in the above-mentioned embodiment.

Then, the buffer layers 41 and 42 may be formed in the interior of the ceramic body 10 by sintering the external electrodes 20. In a sintering procedure of the external electrodes 20, the glass of the external electrodes 20 may diffuse or penetrate into the ceramic body 10 to form the buffer layers 41 and 42.

In the procedure of preparing the paste for external electrodes 20, the thickness (t) of the buffer layer 41 or 42 may be controlled by regulating contents of an alkaline metal oxide contained in the glass.

The use of glass having large contents of an alkali metal and vanadium oxide may further increase the thickness (t) of the buffer layer 41 or 42. The reason is that the softening point of glass may be lowered as contents of an alkali metal and vanadium oxide are increased, resulting in increasing fluidity of the glass, which may induce more active penetration or diffusion of glass.

On the contrary, when glass having small contents of an alkali metal and vanadium oxide is used, since fluidity of glass is relatively low, penetration or diffusion of glass may be difficult, and thus, the thickness (t) of the buffer layer 41 or 42 may be decreased.

Specifically, the alkali metal may be at least one selected from the group consisting of lithium (Li), sodium (Na), potassium (K), rubidium (Rb), and cesium (Cs).

In addition, in the sintering process, the thickness (t) of the buffer layer 41 or 42 may be controlled by regulating the temperature increase rate at the softening point of glass or higher. Descriptions thereof are the same as those in the above embodiment.

Other descriptions of the external electrode 20, internal electrodes 30, and buffer layers 41 and 42 are the same as those in the above embodiment.

Hereinafter, inventive examples and comparative examples will be described.

Multilayer ceramic capacitors according to inventive examples and comparative examples of the present invention were manufactured by the following method.

A barium titanate powder, ethanol as an organic solvent, and polyvinylbutyral as a binder were mixed, followed by ball milling, thereby preparing a ceramic slurry, which was then used to prepare ceramic green sheets.

A conductive paste for internal electrodes 30 containing nickel was printed on the ceramic green sheets, to form internal electrodes 30 thereon. The resultant sheets were laminated to produce a green laminate, which was then subjected to isostatic pressing with a pressure of 1,000 kgf/cm² at 85° C.

The compressed green laminate was cut into green chips, which were then subjected to a debindering process in which they were maintained at 230° C. under air atmosphere for 60 hours. The green chips were sintered at 950° C., to produce sintered chips. Sintering was performed under the reducing atmosphere to thereby prevent oxidation of the internal electrodes 30. The reducing atmosphere was set to $10^{-11}$~$10^{-10}$ atm, which was lower than the Ni/NiO equilibrium oxygen partial pressure.

External electrodes were formed on external surfaces of the sintered chip by using a paste for external electrodes 20 including a copper powder and a glass powder, and sintered at 780° C. Nickel plating layers and tin plating layers were formed on the external electrodes 20 through electroplating.

First, in order to check appropriateness of the thickness of the external electrodes, multilayer ceramic capacitors of 0603 size were manufactured while the thickness (T) of the external electrodes is varied. The reliability test was performed thereon. The 0603 size is referred to as a case in which a multilayer ceramic capacitor has a size of 0.6 mm×0.3 mm×0.3 mm.

As a result of reliability test, it was determined good when insulation resistance was not reduced to 1E+0.7 Ωcm or lower. The accelerating lifespan evaluation was performed on 40 samples under conditions of 130° C., 2Vr, and 4 hours.

TABLE 1

| T (μm) | Reliability |
| --- | --- |
| 5 | Bad |
| 7 | Bad |
| 9 | Bad |
| 10 | Bad |
| 11 | Good |
| 12 | Good |
| 14 | Good |

Referring to Table 1, in the cases in which the thickness (T) values of the external electrodes are 11 μm, 12 μm and 14 μm, the reliability was not deteriorated. However, the reliability was deteriorated from when the thickness of the external electrodes becomes 10 μm or smaller.

The reason is that the glass of the external electrodes moves into the ceramic body to thereby decrease the content of glass in the external electrodes, and thus the plating liquid penetrates through pores of the external electrode.

The present invention is to solve the problem of deterioration in reliability, which may occur when the thickness (T) of the external electrode is 10 μm or smaller.

Then, in order to check appropriateness of the ratio ($T_A/T_C$) of thickness of the active region ($T_A$) to thickness of the ceramic body ($T_C$), the reliability test was conducted while the value of $T_A/T_C$ was varied.

TABLE 2

| $T_C$ (μm) | $T_A$ (μm) | $T_A/T_C$ | Reliability |
| --- | --- | --- | --- |
| 350 | 266 | 0.76 | Good |
|  | 273 | 0.78 | Good |

TABLE 2-continued

| $T_C$ (μm) | $T_A$ (μm) | $T_A/T_C$ | Reliability |
|---|---|---|---|
|  | 280 | 0.80 | Good |
|  | 287 | 0.82 | Bad |
|  | 294 | 0.84 | Bad |
|  | 301 | 0.86 | Bad |

Referring to Table 2, good reliability was obtained in the case in which the value of $T_A/T_C$ is 0.80 or smaller, and bad reliability was obtained in the case in which the value of $T_A/T_C$ is greater than 0.80.

When the value of $T_A/T_C$ is greater than 0.80, the percentage of internal electrodes in the ceramic body is relatively great, and thus the diffusion of metal elements and glass from the external electrodes into the internal electrodes is increased. As a result, the content of glass present in the external electrodes is decreased, and thus the plating liquid penetrates through the pores of the external electrodes, which may deteriorate the reliability.

The present invention is to solve the problem of deterioration in reliability, occurring when the value of $T_A/T_C$ is greater than 0.80.

Then, in order to check appropriateness of the thickness (t) of the buffer layer 41 or 42, the reliability test was conducted. Here, the thickness (T) of the external electrode was set to 10 μm and the value of $T_A/T_C$ is 0.84 while the thickness (t) of the buffer layer 41 or 42 was varied.

TABLE 3

| | T (μm) | $T_A$ (μm) | $T_C$ (μm) | $T_A/T_C$ | t (μm) | Reliability |
|---|---|---|---|---|---|---|
| Inventive Example 1 | 10 | 294 | 350 | 0.84 | 1 | Good |
| Inventive Example 2 |  |  |  |  | 2 | Good |
| Inventive Example 3 |  |  |  |  | 3 | Good |
| Inventive Example 4 |  |  |  |  | 4 | Good |
| Inventive Example 5 |  |  |  |  | 5 | Good |
| Comparative Example 1 |  |  |  |  | 6 | Bad |
| Comparative Example 2 |  |  |  |  | 7 | Bad |
| Comparative Example 3 |  |  |  |  | 8 | Bad |
| Comparative Example 4 |  |  |  |  | 9 | Bad |

Referring to Table 3, the reliability test results were good in Inventive Examples 1 to 5 in which the thickness (t) values of the buffer layer are 1~5 μm, and the reliability test results were bad in Comparative Examples 1 to 4 in which the thickness (t) values of the buffer layer are 6~9 μm.

Comparative Examples 1 to 4 correspond to cases in which the buffer layer is thick. Since the buffer layer was thick, the content of glass remaining in the external electrodes was small, which could not effectively prevent penetration of the plating liquid, and thus the reliability was deteriorated due to the penetration of the plating liquid.

Whereas, as for Inventive Examples 1 to 5, since the buffer layer was relatively thin, the content of glass remaining in the external electrodes is relatively large, so that the glass effectively prevented the penetration of the plating liquid, and thus the reliability test results were determined good.

As set forth above, according to the embodiments of the present invention, there may be provided a multilayer ceramic electronic component having excellent reliability against penetration of the plating liquid or the like, by preventing the deterioration in compactness of the external electrode.

The terms used in the present specification for explaining specific embodiments have been disclosed for illustrative purposes, and they are for specifically explaining the present invention. Singular forms are intended to include plural forms unless the context clearly indicates otherwise.

The terms "comprise" and/or "comprising" will be understood to imply the inclusion of stated constituents, steps, operations and/or elements but not the exclusion of any other constituents, steps, operations and/or elements.

The present invention is not limited to the above-mentioned embodiments and the accompanying drawings but is defined by the accompanying claims.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
   a ceramic body having internal electrodes formed therein;
   external electrodes formed on external surfaces of the ceramic body and connected to the internal electrodes; and
   a buffer layer formed on surfaces of contact between the internal electrodes and the external electrodes among external surfaces of the ceramic body, in an interior direction of the ceramic body,
   wherein when a thickness of the external electrode is denoted by T, a thickness of the buffer layer is denoted by t, a thickness of an active region is denoted by $T_A$, and a thickness of the ceramic body is denoted by $T_c$, T≤10 μm, $T_A/T_C$>0.8, and t≤5 μm.

2. The multilayer ceramic electronic component of claim 1, wherein the buffer layer has a boron content of 50% or more.

3. The multilayer ceramic electronic component of claim 1, wherein the ceramic body has a rectangular parallelepiped form.

4. The multilayer ceramic electronic component of claim 1, wherein the internal electrodes have a rectangular shape.

5. The multilayer ceramic electronic component of claim 1, wherein the external electrodes are formed on end surfaces of the ceramic body.

6. The multilayer ceramic electronic component of claim 1, wherein the external electrodes are extended to portions of upper, lower and side surfaces of the ceramic body.

7. The multilayer ceramic electronic component of claim 1, wherein the ceramic body includes barium titanate or strontium titanate.

8. The multilayer ceramic electronic component of claim 1, wherein the external electrodes include glass.

9. The multilayer ceramic electronic component of claim 1, wherein the internal electrodes include at least one selected from the group consisting of gold (Au), silver (Ag), copper (Cu), nickel (Ni), palladium (Pd), platinum (Pt), and alloys thereof.

10. The multilayer ceramic electronic component of claim 1, wherein the external electrodes include at least one selected from the group consisting of gold (Au), silver (Ag), palladium (Pd), copper (Cu), nickel (Ni), and alloys thereof.

11. The multilayer ceramic electronic component of claim 1, wherein the buffer layer is arranged in an interior of the ceramic body.

12. A multilayer ceramic electronic component, comprising:
   external electrodes including first and second external electrodes formed on end surfaces of a ceramic body, which oppose each other;
   internal electrodes including first and second internal electrodes laminated and separated from each other in an interior of the ceramic body, the first and second internal electrodes being connected to the first and second external electrodes, respectively; and buffer layers formed from the end surfaces of the ceramic body in an interior direction of the ceramic body, respectively, wherein when a thickness of the external electrode is denoted by T, a thickness of the buffer layer is denoted by t, a thickness of an active region is denoted by $T_A$, and a thickness of the ceramic body is denoted by $T_C$, $T \leq 10$ μm, $T_A/T_C > 0.8$, and $t \leq 5$ μm.

13. The multilayer ceramic electronic component of claim 12, wherein the buffer layers are respectively provided as a region from the end surface of the ceramic body to a portion in which a boron component is detected.

14. The multilayer ceramic electronic component of claim 12, wherein the ceramic body has a rectangular parallelepiped form.

15. The multilayer ceramic electronic component of claim 12, wherein the internal electrodes have a rectangular shape.

16. The multilayer ceramic electronic component of claim 12, wherein the external electrodes are extended to portions of upper, lower and side surfaces of the ceramic body.

17. The multilayer ceramic electronic component of claim 12, wherein the ceramic body includes barium titanate or strontium titanate.

18. The multilayer ceramic electronic component of claim 12, wherein the external electrodes include glass.

19. The multilayer ceramic electronic component of claim 12, wherein the internal electrodes include at least one selected from the group consisting of gold, silver, copper, nickel, palladium, platinum, and alloys thereof.

20. The multilayer ceramic electronic component of claim 12, wherein the external electrodes include at least one selected from the group consisting of gold, silver, palladium, copper, nickel, and alloys thereof.

21. A method of manufacturing a multilayer ceramic electronic component, the method comprising:

preparing a paste for external electrodes including glass and conductive metal;

forming external electrodes on a sintered chip, in which internal electrodes are laminated, by using the paste for external electrodes; and sintering the external electrodes by regulating a temperature increase rate at a softening point of the glass or higher to control a thickness of a buffer layer.

22. The method of claim 21, wherein the temperature increase rate is increased to decrease the thickness of the buffer layer.

23. The method of claim 21, wherein the temperature increase rate is decreased to increase the thickness of the buffer layer.

24. The method of claim 21, wherein the buffer layer is formed in an interior of the sintered chip.

25. A method of manufacturing a multilayer ceramic electronic component, the method comprising:

preparing a paste for external electrodes including glass;

forming external electrodes on a sintered chip, in which internal electrodes are laminated, by using the paste for external electrodes; and sintering the external electrodes, wherein in the preparing of the paste for external electrodes, a thickness of a buffer layer is controlled by regulating contents of an alkali metal and vanadium oxide contained in the glass.

26. The method of claim 25, wherein the alkali metal is at least one selected from the group consisting of lithium (Li), sodium (Na), potassium (K), rubidium (Rb), and cesium (Cs).

27. The method of claim 25, wherein the thickness of the buffer layer is increased by increasing contents of the alkali metal and vanadium oxide.

28. The method of claim 25, wherein the thickness of the buffer layer is decreased by decreasing contents of the alkali metal and vanadium oxide.

29. The method of claim 25, wherein in the sintering, the thickness of the buffer layer is controlled by regulating a temperature increase rate at a softening point of the glass or higher.

30. The method of claim 29, wherein the temperature increase rate is increased to decrease the thickness of the buffer layer.

31. The method of claim 29, wherein the temperature increase rate is decreased to increase the thickness of the buffer layer.

32. The method of claim 25, wherein the buffer layer is formed in an interior of the sintered chip.

* * * * *